US012429893B2

(12) United States Patent
Zhou

(10) Patent No.: US 12,429,893 B2
(45) Date of Patent: Sep. 30, 2025

(54) LOW DROPOUT REGULATOR CIRCUIT WITH REDUCED OVERSHOOT AND UNDERSHOOT AND THE METHOD THEREOF

(71) Applicant: Chengdu Monolithic Power Systems Co., Ltd., Chengdu (CN)

(72) Inventor: Yong Zhou, Chengdu (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 258 days.

(21) Appl. No.: 18/326,692

(22) Filed: May 31, 2023

(65) Prior Publication Data

US 2023/0400872 A1 Dec. 14, 2023

(30) Foreign Application Priority Data

Jun. 13, 2022 (CN) ......................... 202210664348.5

(51) Int. Cl.

*G05F 1/575* (2006.01)
*G05F 1/46* (2006.01)
*G05F 3/26* (2006.01)

(52) U.S. Cl.

CPC .............. *G05F 1/575* (2013.01); *G05F 1/465* (2013.01); *G05F 3/262* (2013.01)

(58) Field of Classification Search

CPC ... G05F 1/10; G05F 1/267; G05F 1/46; G05F 1/561; G05F 1/567; G05F 1/569; G05F 1/571; G05F 1/573; G05F 1/5735; G05F 1/461; G05F 1/462; G05F 1/463; G05F 1/465; G05F 1/466; G05F 1/467; G05F 1/56; G05F 1/562; G05F 1/563; G05F 1/565; G05F 1/575; G05F 1/577; G05F 1/585; G05F 1/59; G05F 1/595; G05F 1/607; G05F 1/61; G05F 1/613; G05F 1/614; G05F 1/618; G05F 1/62; G05F 1/66; G05F 1/08; G05F 1/153; G05F 1/16; G05F 1/26; G05F 1/34

See application file for complete search history.

(56) References Cited

U.S. PATENT DOCUMENTS

2007/0290665 A1 12/2007 Moraveji
2008/0189071 A1 8/2008 Aguilar et al.
2016/0149494 A1 5/2016 Li
2021/0303014 A1* 9/2021 Migliavacca ........... G05F 1/575
2022/0206519 A1 6/2022 Zhong

FOREIGN PATENT DOCUMENTS

WO 2022082656 A1 4/2022

* cited by examiner

*Primary Examiner* — Bryan R Perez
(74) *Attorney, Agent, or Firm* — Perkins Coie LLP

(57) ABSTRACT

A low dropout regulator circuit with reduced overshoot and undershoot during transient state is discussed. The low dropout regulator circuit has a power device operating at a restive region, a first amplification stage and a second amplification stage. The first amplification stage amplifies a difference between a feedback voltage and a reference voltage to generate a positive signal and a negative signal. The feedback voltage is derived from an output voltage via a feedback resistor network. The second amplification stage amplifies a difference between the positive signal and a sum of a feed forward signal and the negative signal to generate an amplified signal. The feed forward signal is derived from an output voltage via a capacitor network.

16 Claims, 2 Drawing Sheets

LOW DROPOUT REGULATOR CIRCUIT WITH REDUCED OVERSHOOT AND UNDERSHOOT AND THE METHOD THEREOF

CROSS-REFERENCE TO RELATED APPLICATIONS

This application claims priority to and the benefit of Chinese Patent Application No. 202210664348.5, filed Jun. 13, 2022, which is incorporated herein by reference in its entirety.

BACKGROUND OF THE INVENTION

Low dropout (LDO) linear regulators are widely used because they provide a specific DC voltage with low noise and well stability. However, instantaneous overshoots and undershoots may be generated in the LDO regulators due to load changes, which bring harm to the circuit.

How to reduce the instantaneous overshoot and undershoot in the LDO regulator is a challenge in the field.

SUMMARY OF THE INVENTION

In accordance with an embodiment of the present invention, a low dropout regulator circuit is discussed. The low dropout regulator circuit comprises: a power device, a first amplification stage and a second amplification stage. The power device is configured to operate at a resistive region, to convert an input voltage to an output voltage. The first amplification stage is configured to receive a feedback voltage indicative of the output voltage by way of a feedback resistor network, to generate a positive signal and a negative signal by amplifying a difference between the feedback voltage and a reference voltage. The second amplification stage is configured to receive a feed forward signal indicative of the output voltage by way of a feedback capacitor, to generate an amplified signal by amplifying a difference between the positive signal and a sum of the feed forward signal and the negative signal, to control the power device.

In addition, in accordance with an embodiment of the present invention, a low dropout regulator circuit is discussed. The low dropout regulator circuit comprises: a power device, a first amplification stage and a second amplification stage. The power device is configured to operate at a resistive region, to convert an input voltage to an output voltage. The first amplification stage is configured to receive a feedback voltage indicative of the output voltage by way of a feedback resistor network, to generate a positive signal and a negative signal by amplifying a difference between the feedback voltage and a reference voltage. The second amplification stage is configured to receive a feed forward signal indicative of the output voltage by way of a feedback capacitor, to generate an amplified signal by amplifying a difference between the negative signal and an algebraic difference of the feed forward signal and the positive signal, to control the power device.

Furthermore, in accordance with an embodiment of the present invention, a method used in a LDO regulator circuit is discussed. The method comprises: controlling a power device to operate at a resistive region, to convert an input voltage to an output voltage; receiving a feedback voltage indicative of the output voltage by way of a feedback resistor network, and amplifying a difference between the feedback voltage and a reference voltage to generate a positive signal and a negative signal; and receiving a feed forward signal indicative of the output voltage by way of a feedback capacitor, and amplifying a difference between the positive signal and a sum of the feed forward signal and the negative signal to generate an amplified signal, to control the power device.

DETAILED DESCRIPTION OF THE INVENTION

Embodiments of circuits for LDO regulator circuit are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
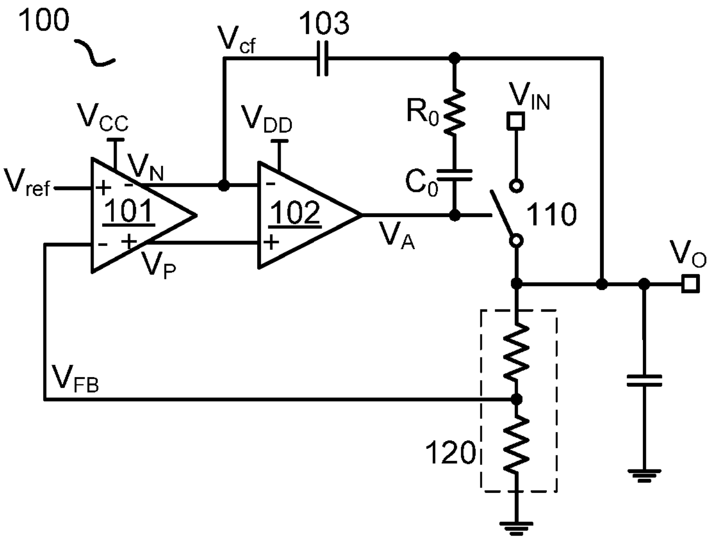
FIG. 1 schematically shows a LDO regulator circuit 100 in accordance with an embodiment of the present invention.

FIG. 1 schematically shows a LDO regulator circuit 100 in accordance with an embodiment of the present invention. In the example of FIG. 1, the LDO regulator circuit 100 comprises: a power device 110, a first amplification stage 101 and a second amplification stage 102. The power device 110 is controlled to operate at a resistive region, to convert an input voltage VIN to an output voltage $V_O$. The first amplification stage 101 has two inputs (e.g., differential inputs) and two outputs (e.g., differential outputs). The first amplification stage 101 is configured to receive a feedback voltage $V_{FB}$ indicative of the output voltage $V_O$ by way of a feedback resistor network 120, and is configured to generate a positive signal $V_P$ at a positive output terminal (+) and a negative signal $V_N$ at a negative output terminal (−) by amplifying a difference between the feedback voltage $V_{FB}$ and a reference voltage $V_{ref}$. The second amplification stage 102 has two inputs (e.g., differential inputs) and a single output. The second amplification stage 102 is configured to receive a feed forward signal $V_{cf}$ indicative of the output voltage $V_O$ by way of a feedback capacitor 103, and is configured to generate an amplified signal $V_A$ by amplifying a difference between the positive signal $V_P$ and a sum ($V_{cf}+V_N$) of the feed forward signal $V_{cf}$ and the negative $V_N$. The amplified signal $V_A$ is configured to control the power device 110.

In one embodiment of the present invention, the so-called "resistive region" means that the power device 110 is controlled to operate at a region that is not fully turned on by controlling a signal (a voltage signal or a current signal) applied at a control terminal of the power device 110. A resistance of the power device 110 in this resistive region may be changed by changing the signal applied at the control terminal of the power device 110.

In one embodiment of the present invention, amplifying the difference between the positive signal $V_P$ and the sum ($V_{cf}$+$V_N$) of the feed forward signal $V_{cf}$ and the negative $V_N$ means that the feed forward signal $V_{cf}$ is first added with the negative signal $V_N$, then a difference of the positive signal $V_P$ and an algebraic sum of the feed forward signal $V_{cf}$ and the negative signal $V_N$ is amplified. In other embodiments of the present invention, amplifying the difference between the positive signal $V_P$ and the sum ($V_{cf}$+$V_N$) of the feed forward signal $V_{cf}$ and the negative signal $V_N$ means that the feed forward signal $V_{cf}$ is first subtracted from the positive signal $V_P$, then a difference of the negative signal $V_N$ and an algebraic difference of the feed forward signal $V_{cf}$ and the positive signal $V_P$ is amplified.

In the example of FIG. 1, the LDO regulator circuit 100 further comprises a resistor $R_0$ and a capacitor $C_0$, coupled between the second amplification stage 102 and the output voltage $V_O$, to perform pole-zero compensation.

In one embodiment of the present invention, the first amplification stage 101 has a low gain, and the second amplification stage 102 has a high gain. That is, the first amplification stage 101 has a first gain, the second amplification stage 102 has a second gain, and the second gain is higher than the first gain. Specifically, the first amplification stage 101 performs an amplification operation on its differential inputs (i.e., the difference between the feedback voltage $V_{FB}$ and the reference voltage $V_{ref}$) with a relatively low magnification. That is, the difference of its differential outputs (i.e., a difference of the positive signal $V_P$ and the negative signal $V_N$) of the first amplification stage 101 is close to the difference of its differential inputs. The second amplification stage 102 performs an amplification on its differential inputs (i.e., the difference between the positive signal $V_P$ and the sum of the feed forward signal $V_{cf}$ and the negative signal $V_N$) with a relatively high magnification. That is, the amplified signal $V_A$ is much larger than the difference of the differential inputs of the second amplification stage 102.

In one embodiment of the present invention, the power device comprises N-type MOSFETs. However, one skilled in the art should realize that the power device may comprise P-type MOSFETs, or other power devices, such as BJT, IGBT, etc.

Figure 2:
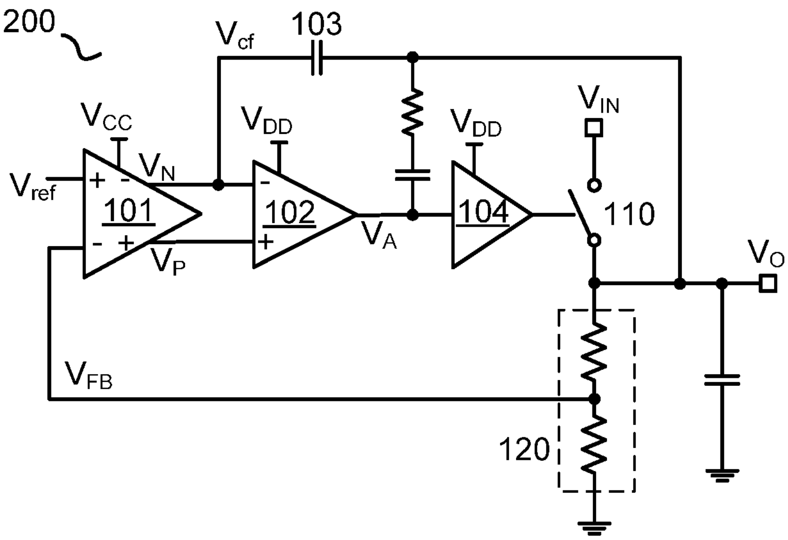
FIG. 2 schematically shows a LDO regulator circuit 200 in accordance with an embodiment of the present invention.

FIG. 2 schematically shows a LDO regulator circuit 200 in accordance with an embodiment of the present invention. The LDO regulator circuit 200 in FIG. 2 is similar with the LDO regulator circuit 100 in FIG. 1, with a difference that in FIG. 2, the LDO regulator circuit 200 further comprises: a buffer stage 104, coupled to the second amplification stage 102, to buffer the amplified signal $V_A$.

In one embodiment of the present invention, the LDO regulator circuit is used in applications having wide input voltages and wide output voltages. That is, the input voltage VIN and the output voltage $V_O$ may both have a wide voltage range. For example, in one embodiment of the present invention, the input voltage VIN may have a range from 1V to 3.6V, and the output voltage $V_O$ may have a range from 0.5V to 3.1V.

In one embodiment of the present invention, the first amplification stage 101 is powered by a first power supply $V_{CC}$, the second amplification stage 102 and the buffer stage 104 are powered by a second power supply $V_{DD}$. The second power supply $V_{DD}$ has a voltage value higher than the first power supply $V_{CC}$. For example, in one embodiment of the present invention, the first power supply $V_{CC}$ may be lower than 3.6V, and the second power supply $V_{DD}$ may be higher than 5V.

Figure 3:
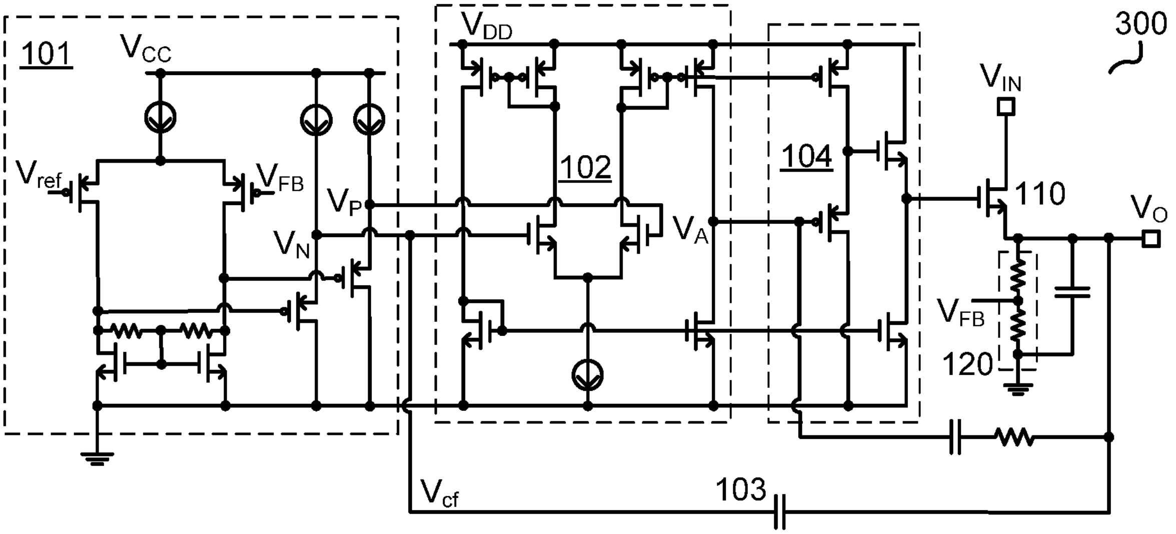
FIG. 3 schematically shows a LDO regulator circuit 300 in accordance with an embodiment of the present invention.

FIG. 3 schematically shows a LDO regulator circuit 300 in accordance with an embodiment of the present invention. In the example of FIG. 3, the first amplification stage 101, the second amplification stage 102 and the buffer stage 104 are schematically shown in the transistor level. As shown in FIG. 3, the first amplification stage 101 is configured to amplify a difference between the reference voltage $V_{ref}$ and the feedback voltage $V_{FB}$, to generate the positive signal $V_P$ and the negative signal $V_N$. The second amplification stage 102 has a first input terminal configured to receive the negative signal $V_N$ and the feed forward signal $V_{cf}$, and a second input terminal configured to receive the positive signal $V_P$. The second amplification stage 102 is configured to amplify the difference between the signals at the two input terminals, to generate the amplified signal $V_A$. The amplified signal $V_A$ is then delivered to the control terminal of the power device 110 via the buffer stage 104, to control the power device 110 to operate at the resistive region.

Figure 4:
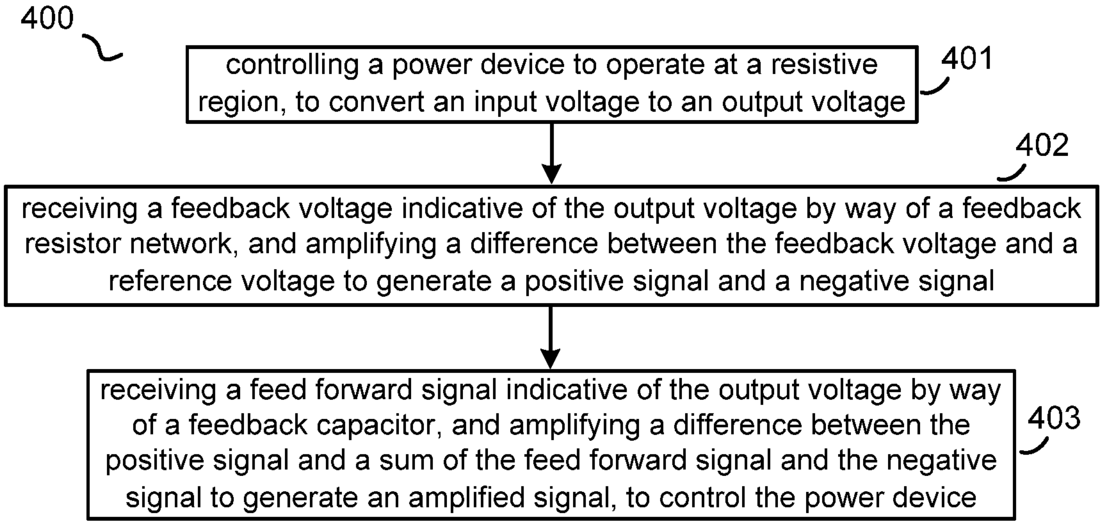
FIG. 4 schematically shows a flowchart 400 of a method used in a LDO regulator circuit in accordance with an embodiment of the present invention.

FIG. 4 schematically shows a flowchart 400 of a method used in a LDO regulator circuit in accordance with an embodiment of the present invention. The method comprises:

Step 401, controlling a power device to operate at a resistive region, to convert an input voltage to an output voltage.

Step 402, receiving a feedback voltage indicative of the output voltage by way of a feedback resistor network, and amplifying a difference between the feedback voltage and a reference voltage to generate a positive signal and a negative signal. And Step 403, receiving a feed forward signal indicative of the output voltage by way of a feedback capacitor, and amplifying a difference between the positive signal and a sum of the feed forward signal and the negative signal to generate an amplified signal, to control the power device.

In one embodiment of the present invention, the method further comprises: buffering the amplified signal to generate a buffered signal. The buffered signal is used to control the power device.

In one embodiment of the present invention, the method further comprises: using a first amplification stage to amplify the difference between the feedback voltage and the reference voltage; using a second amplification stage to amplify the difference between the positive signal and the sum of the feed forward signal and the negative signal; and using a buffer stage to buffer the amplified signal. The first amplification stage is powered a first power supply, the second amplification stage and the buffer stage are powered by a second power supply. The second power supply has a voltage value higher than the first power supply.

Several embodiments of the forgoing LDO regulator circuit provide better performs than the prior art. Unlike the conventional technology, several embodiments of the forgoing LDO regulator circuit introduce the information of the output voltage via a feedback resistor network to a first amplification stage, which amplifies the difference of the feedback voltage and the reference voltage with a low gain magnification to generate differential outputs: the negative signal and the positive signal. Meantime, the information of the output voltage is introduced to a second amplification stage via a feedback capacitor, so that the difference of the positive signal and the sum of the feed forward signal and the negative signal is amplified to control the power device. Thus, when the system is under steady state, or when the output voltage varies slowly (e.g., during the soft start of the system, or during shutdown process, or when the output voltage is regulated online), the feedback capacitor would not introduce noise to the control loop. Thus, the low frequency characteristic of the system would not change. On the contrary, when the output voltage changes rapidly due to load change, the rapid change of the output voltage would be quickly fed back to the second amplification stage via the feedback capacitor, which has a more prompt response than the feedback resistor network. Accordingly, the resistance of the power device would be adjusted, to quickly regulate the output voltage. Thus, several embodiments of the forgoing LDO regulator circuit improve transient response of the system, and reduce the overshoot and undershoot of the output voltage during transient process.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

The invention claimed is:

1. A low dropout regulator circuit, comprising:

a power device, configured to operate at a resistive region, to convert an input voltage to an output voltage;

a first amplification stage, configured to receive a feedback voltage indicative of the output voltage by way of a feedback resistor network, to generate a positive signal and a negative signal by amplifying a difference between the feedback voltage and a reference voltage; and a second amplification stage, configured to receive a feed forward signal indicative of the output voltage by way of a feedback capacitor, to generate an amplified signal by amplifying a difference between the positive signal and a sum of the feed forward signal and the negative signal, to control the power device; wherein the first amplification stage is powered by a first power supply, and the second amplification stage is powered by a second power supply; and wherein the second power supply has a voltage value higher than the first power supply.

2. The low dropout regulator circuit of claim 1, further comprising:

a buffer stage, coupled to the second amplification stage, to buffer the amplified signal.

3. The low dropout regulator circuit of claim 2, wherein:

the buffer stage is powered by the second power supply.

4. The low dropout regulator circuit of claim 1, wherein:

the first amplification stage has a first gain, and the second amplification stage has a second gain; and wherein the second gain is higher than the first gain.

5. The low dropout regulator circuit of claim 1, further comprising:

a resistor and a capacitor, coupled between the second amplification stage and the output voltage, to perform pole-zero compensation.

6. The low dropout regulator circuit of claim 1, wherein:

the input voltage and the output voltage both have a wide voltage range.

7. A low dropout regulator circuit, comprising:

a power device, configured to operate at a resistive region, to convert an input voltage to an output voltage;

a first amplification stage, configured to receive a feedback voltage indicative of the output voltage by way of a feedback resistor network, to generate a positive signal and a negative signal by amplifying a difference between the feedback voltage and a reference voltage; and a second amplification stage, configured to receive a feed forward signal indicative of the output voltage by way of a feedback capacitor, to generate an amplified signal by amplifying a difference between the negative signal and an algebraic difference of the feed forward signal and the positive signal, to control the power device; wherein:

the first amplification stage is powered by a first power supply, and the second amplification stage is powered by a second power supply; and wherein the second power supply has a voltage value higher than the first power supply.

8. The low dropout regulator circuit of claim 7, wherein:

the first amplification stage has a first gain, and the second amplification stage has a second gain; and wherein the second gain is higher than the first gain.

9. The low dropout regulator circuit of claim 7, further comprising:

a buffer stage, coupled to the second amplification stage, to buffer the amplified signal.

10. The low dropout regulator circuit of claim 7, further comprising:

a resistor and a capacitor, coupled between the second amplification stage and the output voltage, to perform pole-zero compensation.

11. The low dropout regulator circuit of claim 7, wherein:

the input voltage and the output voltage both have a wide voltage range.

12. A method used in a LDO regulator circuit, comprising:

controlling a power device to operate at a resistive region, to convert an input voltage to an output voltage;

receiving a feedback voltage indicative of the output voltage by way of a feedback resistor network, and amplifying a difference between the feedback voltage and a reference voltage to generate a positive signal and a negative signal; and receiving a feed forward signal indicative of the output voltage by way of a feedback capacitor, and amplifying a difference between the positive signal and a sum of the feed forward signal and the negative signal to generate an amplified signal, to control the power device; wherein:

the first amplification stage is powered by a first power supply, and the second amplification stage is powered by a second power supply; and wherein the second power supply has a voltage value higher than the first power supply.

13. The method of claim 12, further comprising:

buffering the amplified signal to generate a buffered signal, wherein the buffered signal is used to control the power device.

14. The method of claim 13, further comprising:

using a first amplification stage to amplify the difference between the feedback voltage and the reference voltage;

using a second amplification stage to amplify the difference between the positive signal and the sum of the feed forward signal and the negative signal; and using a buffer stage to buffer the amplified signal.

15. The method of claim 14, wherein:

the buffer stage is powered by the second power supply.

16. The method of claim 12, wherein:

the difference between the feedback voltage and the reference voltage is amplified with a lower gain than that of the difference between the positive signal and the sum of the feed forward signal and the negative signal.

* * * * *